W. E. TRUFANT.
SPRING-GOVERNOR FOR VEHICLES.
APPLICATION FILED DEC. 8, 1906.
1,054,057.
Patented Feb. 25, 1913.
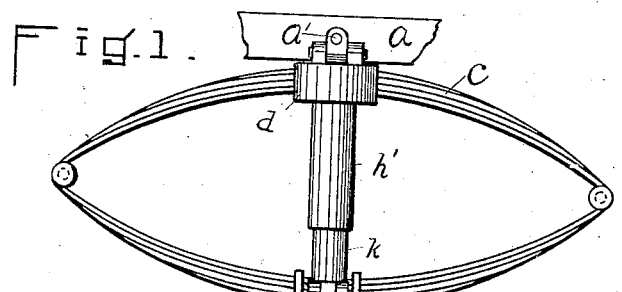
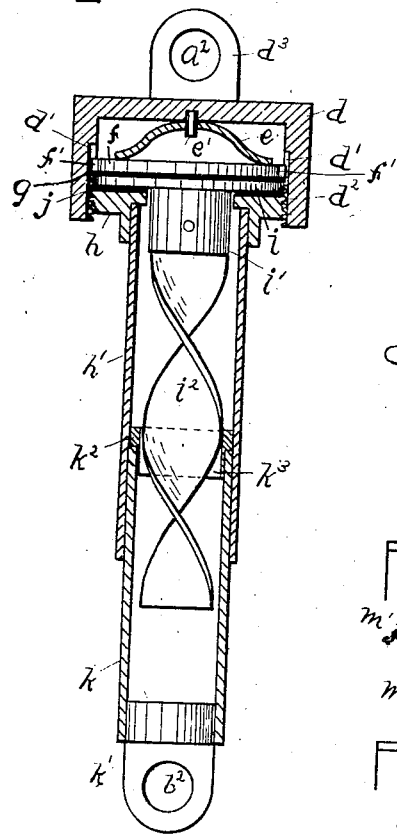
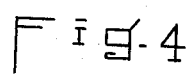
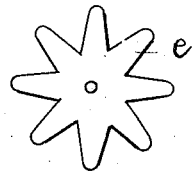
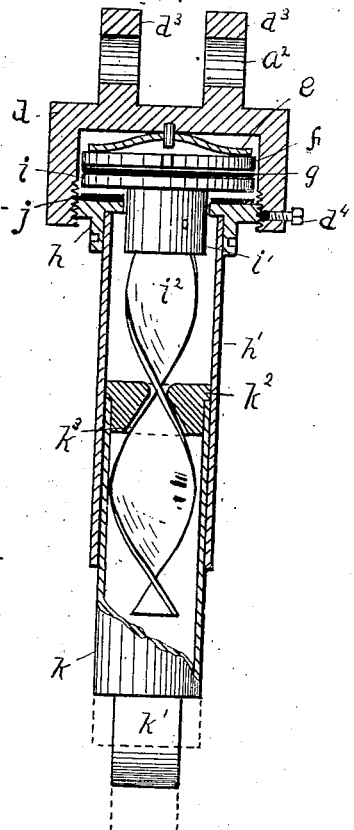
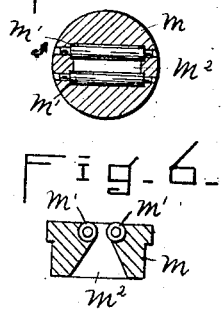
WITNESSES
G. Howard Soule
Geo. D. Soule
INVENTOR
W. E. Trufant

UNITED STATES PATENT OFFICE.

WALTER E. TRUFANT, OF WHITMAN, MASSACHUSETTS, ASSIGNOR TO HARTFORD SUSPENSION COMPANY, OF NEW YORK, N. Y., A CORPORATION OF NEW YORK.

SPRING-GOVERNOR FOR VEHICLES.

1,054,057.   Specification of Letters Patent.   Patented Feb. 25, 1913.

Application filed December 8, 1906. Serial No. 346,865.

*To all whom it may concern:*

Be it known that I, WALTER E. TRUFANT, of Whitman, in the county of Plymouth and State of Massachusetts, have invented certain new and useful Improvements in Spring-Governors for Vehicles, of which the following is a specification.

This invention relates to friction devices for checking the excessive action of vehicle springs when driving, especially in automobiles, over rough or uneven roads, and consists in friction surfaces so arranged that free movement of the springs is allowed up to a certain point after which the retarding means operate to prevent undue lurching of the vehicle or strain on the springs, it also provides for the exerting of a greater retarding effect in one direction than in the other, and in other details all of which will be described, and specifically pointed out in the claims.

In the embodiment of my invention shown in the accompanying drawings forming a part of this specification, Figure 1 shows my invention applied to a vehicle having a full elliptical spring, Fig. 2 is a central longitudinal sectional view of my governor, illustrating the position of the parts on the compression of the vehicle spring incident to approach of the vehicle parts, Fig. 3 is a central longitudinal sectional view taken on a plane at about right angles to the plane of Fig. 2 and showing the position of the parts upon a separation of the vehicle parts.
Fig. 4 shows a form of spring which may be used on the friction disk, Fig. 5 is a horizontal cross sectional view of a modification of the friction disk nut actuator, and Fig. 6 is a longitudinal cross sectional view of the same.

In Fig. 1 $a$ is the frame of the vehicle $b$ the axle and $c$ the spring, $d$ $h^1$ $k$ is the governor pivoted to the frame and axle by the bolts $a^1$ and $b^b$ respectively, so that motion of the spring in all directions is provided for.

In Figs. 2, 3 and 4, $d$ is the enlarged top or disk holder of the governor provided with the ears $d^3$ $d^3$ to connect it to the frame of the vehicle and bored out to contain the friction disks and tapped to receive the enlarged threaded head $h$ of the barrel $h^1$, and is splined at $d^1$ $d^1$. At the top of the recess in $d$ is the spring $e$ held in place by the pin $e^1$ and bearing on the disk $f$. The disk is prevented from rotating by the ears $f^1$ $f^1$ which enter the splines $d^1$ $d^1$ but is free to move axially. Between the disk $f$ and the head $h$ is the disk $i$ above which is the disk of leather or other friction material $g$ and below is another disk or washer $j$ of the same material. The disk $i$ is provided with the hub $i^1$ to which the spiral bar $i^2$ is fixed. This bar extends into the barrel $k$ said barrel being telescoped into the barrel $h^1$. Rotary movement of the barrel $k$ is prevented by a fastening bolt through the hole $b^{2^1}$ in the ear $k^1$. Rigidly secured in the top of the barrel $k$ is the nut or head $k^2$ containing the slot $k^3$ through which passes the bar $i^2$.

When the governor is in use all vertical movement of the body of the vehicle relative to the axle causes an axial movement in the telescope joint between the barrels. For a short distance this movement will preferably be unresisted, in the illustration the twisted bar is a loose fit in the slot in the head $k^2$ but beyond what is provided for in this way such movement must be accompanied by turning of the bar as it slides in the nut and this movement is retarded by the resistance of the bar to rotate in the barrels caused by the friction on the disk $i$. The amount of friction on the disk is regulated by loosening the screw $d^4$ and screwing in or out the barrel and head $h$ $h^1$. It is desirable to have much less resistance to the closing of the vehicle springs or downward movement of the body than to the upward movement and this I accomplish by placing the tension spring $e$ above the disks so that as the spring of the vehicle is compressed the governor is shortened, as shown in Fig. 3 and the resistance of the disk to revolve causes the nut $k^2$ to exert a lifting pressure on the bar $i^2$ which tends to compress the spring $e$ and lift the disk $i$ off the friction surface $j$, as shown, and on the upward movement of the body the resistance to the disk turning caused by the pull of the nut is added to instead of being subtracted from the normal resistance.

In the modification shown in Figs. 5 and 6, $m$ is the nut and $m^1$ $m^1$ are rolls on each side of the slot $m^2$ so as to, when desirable, reduce the friction at this point.

I make the pitch of the twisted bar slightly less near the ends and flatten it slightly near the center so that the resistance will be increased as the limits of vehicle spring action is approached, but in my device there is always a neutral position which is automatically reached that allows some unresisted action of the vehicle springs whether they are normally compressed under a heavy load or extended under a light load.

What I claim as new, and desire to secure by Letters Patent of the United States, is—

1. In a spring governor, the combination of a disk holder, two non-rotary friction members in said holder, one of said members being free to move toward and from the other member, a disk between said members, means tending to keep said members and disk in yielding contact, and a spiral bar for rotating said disk to retard the action of the spring.

2. In a vehicle spring governor, the combination of a holder, two non-rotary friction members in said holder, one of said members being free to move toward and from the vehicle body, a rotatable friction member between said non-rotary members, one of said non-rotary members being adapted to move away from said rotatable member upon the downward movement of the vehicle body for reducing the friction between said non-rotary members and said rotatable member, and means for rotating said rotatable member for retarding the action of the vehicle spring.

3. In a vehicle spring governor, the combination of a holder, two non-rotary friction members in said holder, one of said members being adapted to move toward and from the other member, a rotatable friction member between said non-rotary members, a tension spring tending to keep said members in contact and being located in position to yield for reducing the pressure between said members on the downward movement of the vehicle spring and for permitting maximum pressure upon the rebound, means for adjusting the pressure of said tension spring, and means for rotating said rotatable member for retarding the action of the vehicle spring.

4. In a spring governor, the combination of telescoping barrels, one of said barrels containing two non-rotary friction members, one of said members being free to move toward and from the other member, a disk between said members, means tending to keep said members and disk in yielding contact, and a spiral bar for rotating said disk to retard the action of the spring.

5. In a spring governor, the combination of telescoping barrels, one of said barrels containing two non-rotary friction members, one of said members being free to move toward and from the other member, a disk between said members, a tension spring tending to keep said members and disk in contact, and means for rotating said disk to retard the action of the spring.

6. In a spring governor, the combination of telescoping barrels, one of said barrels containing two non-rotary friction members, one of said members being free to move toward and from the other member, a disk between said members, a tension spring tending to keep said members and disk in contact, means for adjusting the pressure on said tension spring, and means for rotating said disk to retard the action of the spring.

7. In a spring governor, the combination of two telescoping barrels, one of said barrels containing a friction surface, a rotary friction disk in contact with said surface, means for adjusting the pressure between said surface and disk, a nut in the other barrel, and a spiral bar on said disk engaging said nut to rotate said disk.

8. In a spring governor, the combination of two telescoping barrels, one of said barrels containing a friction surface, a rotary friction disk in contact with said surface, a nut in the other barrel, and a spiral bar on said disk engaging said nut to rotate said disk.

9. A spring governor consisting of two telescoping barrels, a nut carried by one of said barrels, an adjustable friction device composed of disks in the other barrel, and means between said nut and friction device to revolve one of said disks and retard the axial movement of said barrels.

10. In a spring governor, the combination of a vehicle spring, telescoping barrels containing a rotating friction disk, the friction disk, and means for rotating said disk by the action of said spring.

11. The combination in a vehicle, of a body, an axle for carrying said body, a spring between said body and axle, a friction surface connected to said body, a slotted nut connected to said axle, and a friction surface having a spiral bar extending normal to said surface, said bar having less pitch as the end is approached whereby said disk is caused to revolve relatively farther as the limit of the spring's action is approached.

12. In a vehicle spring governor, the combination with a pair of telescopic barrels, said barrels being respectively constructed and adapted for connection to portions of a vehicle spring movable one relatively to the other, two non-rotary friction members located within one of said barrels, one of said members being free to move toward and from the other member, a disk located between said members, means tending to keep said members and disk in yielding contact, an engaging member carried by the other of said barrels, and a spiral bar in engagement with said engaging member for rotating said disk to retard the action of the vehicle spring.

13. In a vehicle spring governor, the combination of two non-rotary friction members, one of said members being free to move toward and from the other member in the line of the direction of spring movement, a friction member between said non-rotary members and rotatable on an axis parallel with the said line, means tending to normally keep said non-rotary members and said rotatable member in contact, and means for rotating said rotatable member upon the action of the spring for retarding same.

In testimony whereof I have affixed my signature, in the presence of two witnesses.

WALTER E. TRUFANT.

Witnesses:
G. HOWARD SOULE,
GEO. D. SOULE.